US007178169B1

(12) United States Patent
Salmonsen et al.

(10) Patent No.: US 7,178,169 B1
(45) Date of Patent: Feb. 13, 2007

(54) METHOD AND APPARATUS FOR SECURING TRANSFER OF AND ACCESS TO DIGITAL CONTENT

(75) Inventors: Daniel R. Salmonsen, Saratoga, CA (US); Don Shulsinger, Waban, MA (US)

(73) Assignee: Zoran Corporation, Sunnyvale, CA (US)

( * ) Notice: Subject to any disclaimer, the term of this patent is extended or adjusted under 35 U.S.C. 154(b) by 643 days.

(21) Appl. No.: 09/653,966

(22) Filed: Sep. 1, 2000

(51) Int. Cl.
G06F 1/26 (2006.01)
G06F 11/00 (2006.01)
G08B 13/00 (2006.01)
G06K 9/00 (2006.01)
H04L 9/00 (2006.01)
H04L 9/32 (2006.01)

(52) U.S. Cl. .......................................... 726/31; 726/28
(58) Field of Classification Search ................ 713/202, 713/193, 165, 171, 153; 705/55, 56, 58; 726/28, 31
See application file for complete search history.

(56) References Cited

U.S. PATENT DOCUMENTS

| 6,002,772 | A | * | 12/1999 | Saito ............................ 705/58 |
| 6,035,403 | A | * | 3/2000 | Subbiah et al. ................ 726/28 |
| 6,192,405 | B1 | * | 2/2001 | Bunnell ....................... 709/225 |
| 6,236,727 | B1 | * | 5/2001 | Ciacelli et al. .............. 380/212 |
| 6,338,049 | B1 | * | 1/2002 | Walker et al. ................. 705/44 |
| 6,499,106 | B1 | * | 12/2002 | Yaegashi et al. ............. 713/193 |
| 6,584,567 | B1 | * | 6/2003 | Bellwood et al. ............ 713/171 |
| 6,611,812 | B2 | * | 8/2003 | Hurtado et al. ................ 705/26 |
| 6,615,192 | B1 | * | 9/2003 | Tagawa et al. ................ 705/57 |
| 6,636,966 | B1 | * | 10/2003 | Lee et al. ..................... 713/165 |
| 6,691,149 | B1 | * | 2/2004 | Yokota et al. ............... 709/201 |
| 6,697,945 | B2 | * | 2/2004 | Ishiguro et al. ............. 713/171 |

OTHER PUBLICATIONS

Schneier, Bruce. Applied Cryptography, Second Edition, 1996 John Wiley & Sons.*
Sibert, Olin et al. Securing the Content, Not the Wire, for Information Commerce, 1996 Intertrust.*
Menezes, Alfred J. et al. Handbook of Applied Cryptography, 1997 CRC Press, pp. 553-554.*
Schneier, Bruce. Applied Cryptography, Second Edition, 1996 John Wiley & Sons, pp. 33 & 180.*

* cited by examiner

Primary Examiner—Kambiz Zand
Assistant Examiner—Michael J. Simitoski
(74) Attorney, Agent, or Firm—Blakely, Sokoloff, Taylor & Zafman (57) ABSTRACT

A method and apparatus for securely accessing digital content is provided. The method of providing secure access to content comprises determining an identification (ID) from a secure medium including content. The method further comprises sending a session key and the ID to a server. Furthermore, the method includes requesting user authentication and if the user is successfully authenticated, receiving the session key from the server to enable reading of the content on the secure medium.

16 Claims, 8 Drawing Sheets

METHOD AND APPARATUS FOR SECURING TRANSFER OF AND ACCESS TO DIGITAL CONTENT

FIELD OF THE INVENTION

The present invention relates to digital content, and more specifically, to using a secure server to provide access to digital content.

BACKGROUND

Compact Disc technology was developed at a time when the Internet as we know it today did not exist. At the time, no thought was given to the security issues faced today by the content industry. However, now, with the advent of the Internet, the security of content provided on compact disc is a problem.

In the prior art system when a compact disc is placed in a legacy drive, the data can be "ripped," e.g. acquired by a computer system, and thus distributed to the world. Generally ripping data includes generating a digital copy of the data and compressing this digital copy. One example of the compression mechanism used is MP3. This permits a user to make any number of copies of the tracks ripped from the original disc. Furthermore, the application can make copied discs, which may be used by others. This is disadvantageous to the content providers, since users can create copied discs and distribute content via the Internet. It is also disadvantageous to users because ripping a disc is a tedious, unreliable process.

One prior art solution is to encrypt the data on the disk, and provide a key to the user to decrypt the data. However, the user can pass the data key along to other users. Therefore, this solution is not secure.

SUMMARY OF THE INVENTION

A method and apparatus for securely accessing digital content is provided. The method of providing secure access to content comprises determining an identification (ID) from a secure including content. The method further comprises sending a session key and the ID to a server. Furthermore, the method including requesting user authentication and if the user is successfully authenticated, receiving the session key from the server to enable reading of the content on the secure medium.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for securing transfer of and access to digital content is described. The method includes a secure drive for receiving the secured disk, an application running on a non-secure client system, and a secure server accessible by the client system. The secured disk includes encrypted content and a disk ID. The secure drive accesses the content on the disk, and receives a disk ID. This disk ID, along with a one-time session key generated by the secure drive is sent to the secure server. For one embodiment, this data is sent via the insecure application and an insecure network. For one embodiment, this data is encrypted by the secure drive. For one embodiment, a symmetric key is used by the secure drive to encrypt this data.

In response to receiving this data, the secure server looks up the appropriate disk validation, and requests from the application on the client system a user authentication. The application requests such an authentication from the user, and sends it to the secure server. For one embodiment, the secure server and the application use public key cryptography to communicate.

In response to the authentication data, the secure server determines whether there is authentication data associated with the disk ID. If no such data is associated with the disk ID, the server associates the newly received data with the disk ID. The secure server then considers the user authenticated. If there is authentication data associated with the disk ID, the secure server verifies that the newly received data matches the data associated with the disk ID. If so, the secure server considers the user authenticated. The secure server then returns to the application a content decryption key to decrypt the content on the disk, and the session key.

The application, upon receiving these keys, requests the data from the secure drive. After the secure drive receives the validation, indicating that the user has been authorized to receive the data, the drive encrypts the data using the session key, and sends it to the application. The application uses the session key to decrypt the data, and then uses the content decryption key to perform additional decryption. The content is then available to the user via the application. In this way, the content is only accessible if the user authentication matches the user who is associated with the disk ID.

The term "disk" in the present application means any medium, removable or fixed, optical, silicon, or magnetic, which may be used to store encrypted content. For simplicity, the term disk will be used henceforth. However, the disk may be a flash memory, a hard drive, an optical disc, a magnetic drive, a memory stick, or another type of storage device. The term "drive" in the present application is any device for accessing secure content, and which interacts with the disk. The drive may be an application, device, or memory interface into which the disk may be placed. For simplicity, however, the term drive will be used henceforth.

For one embodiment, the disk may include data that is not encrypted, in addition to the encrypted data. However, the encrypted data may be designed to be accessible only by secure drives. In that instance, the data discussed below only refers to the encrypted data. For one embodiment, the disk format used for this mechanism may be the Gold format described in U.S. patent application Ser. No. 09/537,901, entitled "Secure Compact Disc Technology."

Figure 1:
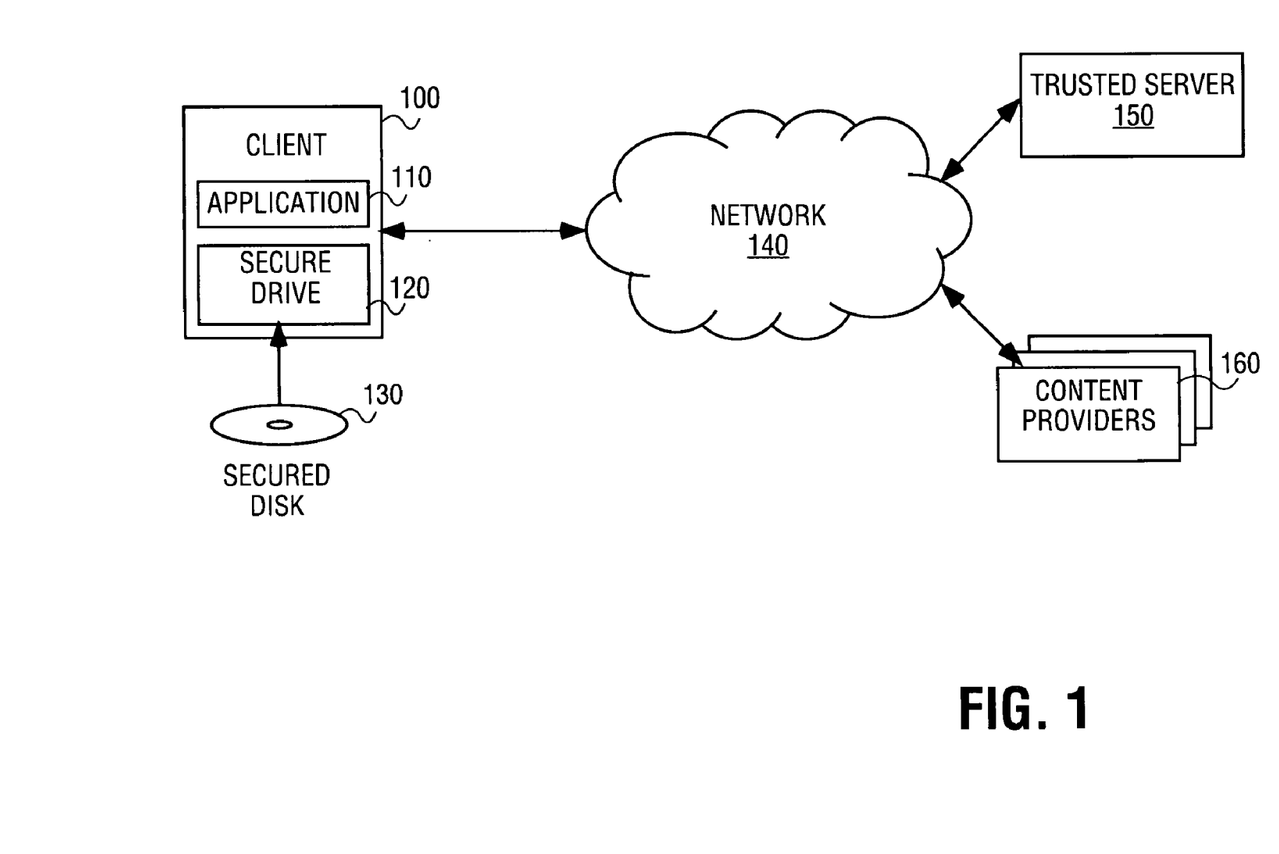
FIG. 1 is a network diagram of one embodiment of a network which may be used to implement the system.

FIG. 1 is a network diagram of one embodiment of a network that may be used to implement the system. Client 100 is coupled to a trusted server 150 via network 140. For one embodiment, network 140 is an insecure network, such as the Internet. The client 100 may be coupled to the network 140 via a modem, a digital subscriber line (DSL), a wireless connection, a local area network (LAN), or another type of connection.

Further, content providers 160 are coupled to the network 140. Content providers 160 provide digital content to the disk 130.

Client system 100 is a computer system, which may be used to run an application 110. The application 110 is able to pass data from the client 100 through the network 140 to the trusted server 150. The client 100 further includes a secure drive 120. A secure drive 120 receives the disk 130 including content. The secure drive 120 is considered secure because it is not directly accessible by the application 110 or anything running on the client device 100. The secure drive 120 furthermore uses encryption, as will be described below, to securely send messages through the network 140, without permitting the application 110 or client 100 to decipher the message. Secure disk 130 is considered secure because content on the secure disk 130 is encrypted, or otherwise made inaccessible directly by the application 110 or client 100 without a decryption key or similar logic.

For one embodiment, the server 150 may reside on the same system as the client 100. As is known in the art, a single device may server as both a server 150 and a client 100. In that instance, the data being sent from server 150 to client 100 is not sent via network 140, but rather internally. However, otherwise, the mechanisms described below are not substantively changed.

Figure 2:
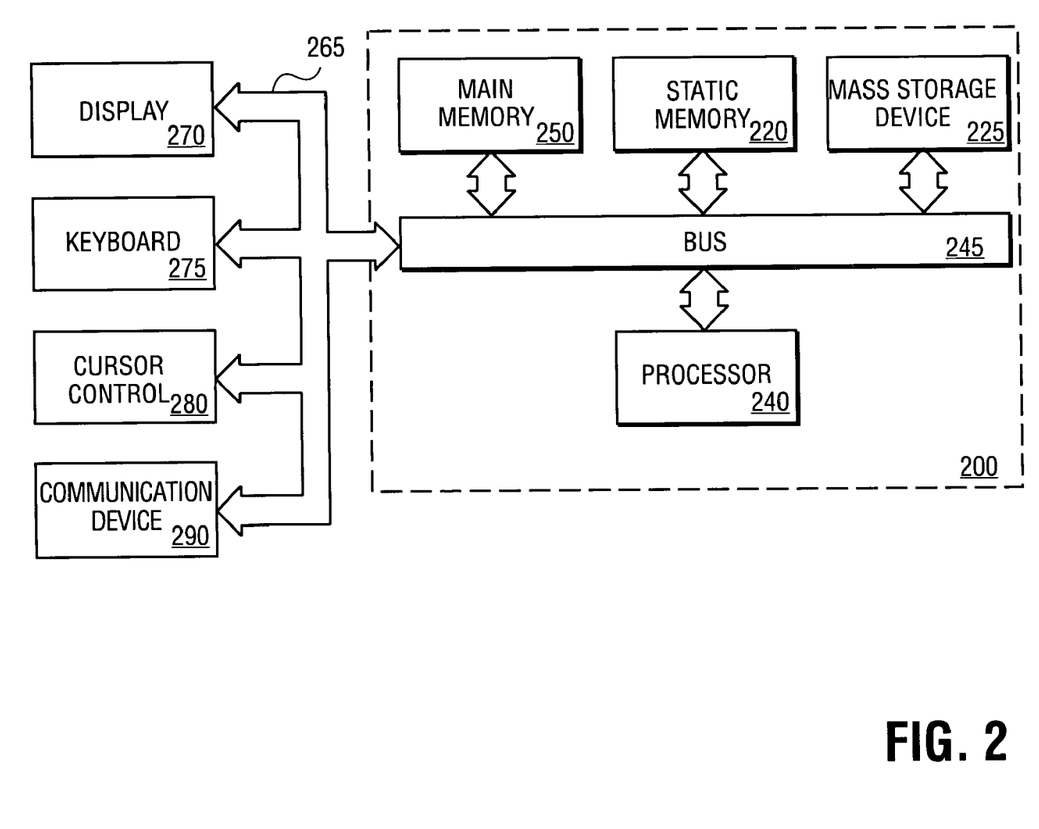
FIG. 2 is a block diagram of one embodiment of a computer system which may be used with the present invention.

FIG. 2 is one embodiment of computer system on which the present invention may be implemented. It will be apparent to those of ordinary skill in the art, however that other alternative systems of various system architectures may also be used.

The system illustrated in FIG. 2 includes a bus or other internal communication means 245 for communicating information, and a processor 240 coupled to the bus 245 for processing information. The system further comprises a random access memory (RAM) or other volatile storage device 250 (referred to as memory), coupled to bus 245 for storing information and instructions to be executed by processor 240. Main memory 250 also may be used for storing temporary variables or other intermediate information during execution of instructions by processor 240. The system also comprises a read only memory (ROM) and/or static storage device 220 coupled to bus 245 for storing static information and instructions for processor 240, and a data storage device 225 such as a magnetic disk or optical disk and its corresponding disk drive. Data storage device 225 is coupled to bus 245 for storing information and instructions.

The system may further be coupled to a display device 270, such as a cathode ray tube (CRT) or a liquid crystal display (LCD) coupled to bus 245 through bus 265 for displaying information to a computer user. An alphanumeric input device 275, including alphanumeric and other keys, may also be coupled to bus 245 through bus 265 for communicating information and command selections to processor 240. An additional user input device is cursor control device 280, such as a mouse, a trackball, stylus, or cursor direction keys coupled to bus 245 through bus 265 for communicating direction information and command selections to processor 240, and for controlling cursor movement on display device 270. Another device that may optionally be coupled to bus 245 thorough bus 265 is a communication device 290 for accessing other nodes of a distributed system via a network. The communication device 290 may include any of a number of commercially available networking peripheral devices such as those used for coupling to an Ethernet, token ring, Internet, or wide area network. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 240. Other storage media may include floppy disks, memory cards, flash memory, or CD-ROM drives. It will be apparent to those of ordinary skill in the art that the methods and processes described herein can be implemented as software stored in main memory 250 or read only memory 220 and executed by processor 240. This control logic or software may also be resident on an article of manufacture comprising a computer readable medium having computer readable program code embodied therein and being readable by the mass storage device 225 and for causing the processor 240 to operate in accordance with the methods and teachings herein.

The software of the present invention may also be embodied in a handheld or portable device containing a subset of the computer hardware components described above. For example, the handheld device may be configured to contain only the bus 245, the processor 240, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 3:
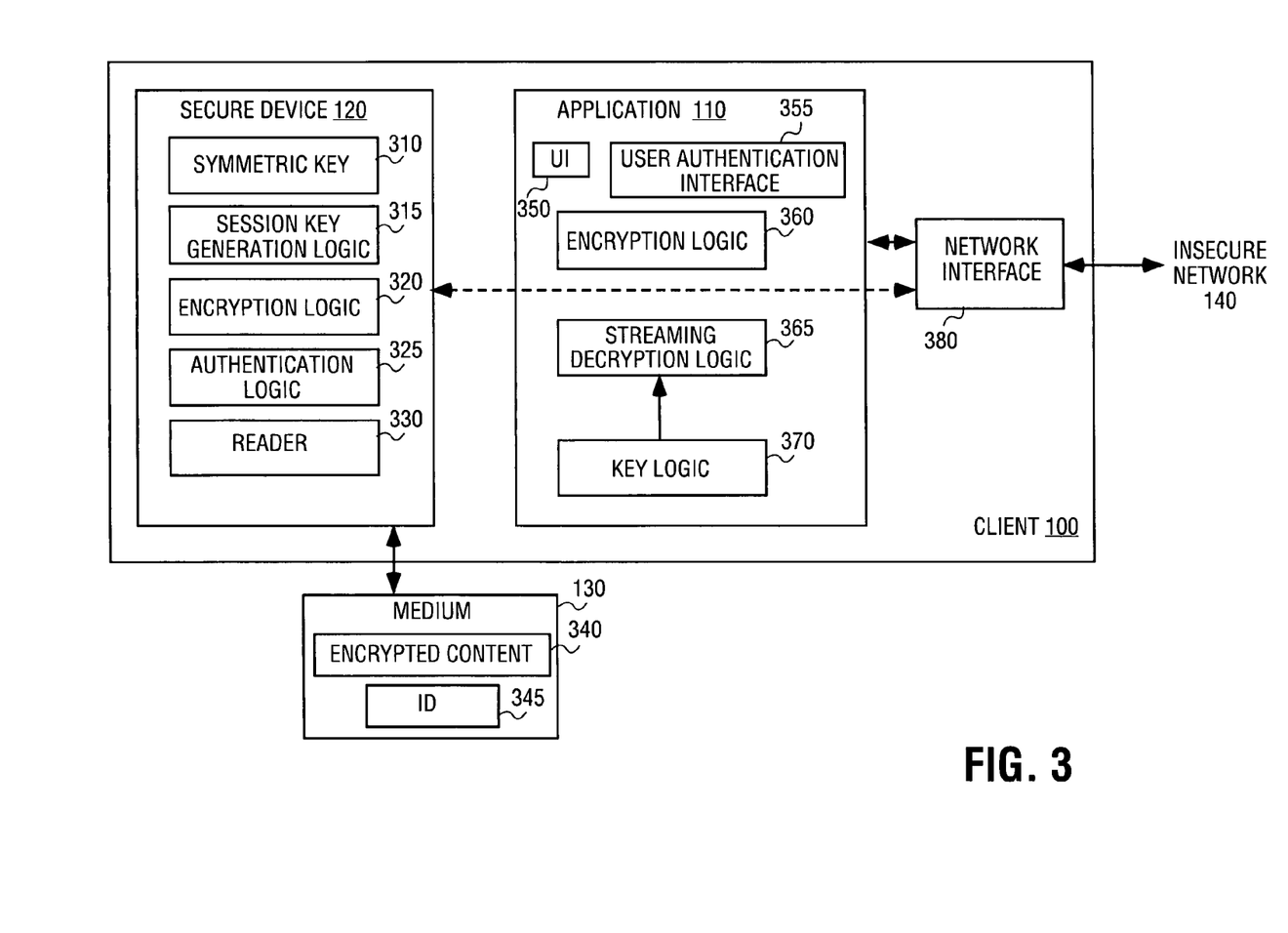
FIG. 3 is a block diagram of one embodiment of the client system.

FIG. 3 is a block diagram of one embodiment of the client system. The client 100 includes the secure device 120, which is the device into which the disk 130 is inserted. As discussed above, the secure device 120 may be a disk drive, or similar device. For another embodiment, the secure device 120 may be a device bay to receive a memory device of another type.

The secure device 120 includes a symmetric key 310 to encrypt data being sent to the secure server, which has the other copy of the symmetric key. For one embodiment, the symmetric key is unique for each device 120, and is generated at the time the device 120 is manufactured. As each device 120 is manufactured, it is registered with the secure server (not shown). Thus, the secure server has a copy of the unique symmetric key of the device 120.

For another embodiment, the symmetric key may be the same for each device 120, or for each set of devices. For one embodiment, the symmetric key of the device 120 may be updateable by the secure server. Thus, for example, the symmetric key may be updated periodically, or if hacking attempts are detected, or for any other reason.

For another embodiment, the device 120 may include a plurality of keys which may be used. For example, one of the plurality of keys may be selected randomly. For another embodiment, the key selected by depend on the security level of the data. For one embodiment, if the data is highly secure, the device 120 or the secure server may request data encrypted with a second symmetric key, after data has been received encrypted by the first key. In this way, hacking into the system is made even more difficult.

For another embodiment, another type of encryption scheme may be used, such as public key encryption. In that instance, the key 310 may be a public key generation logic, to generate another type of key.

The secure device 120 further includes session key generation logic 315. As will be described in more detail below, each session in which data is uploaded to the insecure application 110 uses a session key. This prevents replay attacks, where previously obtained keys and data is used to access disk content. For one embodiment, the session key is a public-private key pair type of key.

Encryption logic 320 uses the session key—generated by session key generator 315—to encrypt content being sent to the application 110. Encryption logic 320 furthermore uses the symmetric key to encrypt data being sent to the secure server (not shown) over the insecure network 140.

Authentication logic 325 sends a disk ID 345 retrieved from the disk, as well as the session key, encrypted by the symmetric key, to the server (not shown). The server then responds, either directly to the authentication logic 325 or through application 110, with an authentication signal. The authentication logic 325 waits for the authentication signal, based on the symmetric key and session key, from the secure server, indicating that the user attempting to access the data has been authenticated. For another embodiment, the authentication logic 325 receives this authentication from the application 110, which receives the data used for the authentication from the secure server. Unless the authentication logic 325 receives the authentication, no data is read from the disk 130 or passed to application 110.

Disk reader 330 reads the data from the disk 130, and passes the data to encryption logic 320. Encryption logic 320 uses the session key to encrypt the data received from the disk 130, and passes the encrypted data to the application 110.

The disk 130 includes pre-encrypted content 340. The disk 130 further includes the disk ID 345, which is used by the secure server, as will be described below.

The application 110 includes a user interface (UI) 350, which permits it to interface with the user, to receive data from the user, and request data from the user, and otherwise permit the user to interact with the application 110 and the disk content.

User authentication interface 355 receives a request from the secure server (not shown) in response to the disk ID, to request authentication from the user. For one embodiment, the user authentication interface 355 may provider various types of authentication, including receiving a user name and password, a credit card number, a disk-provider-specific smart card or similar identification, a biometric identification, or another type of user authentication. This data is passed by the application 110 to the secure server. For one embodiment, encryption logic 360 encrypts the user authentication data prior to passing it to the secure server. For one embodiment, encryption logic 360 uses a public key encryption protocol, which is known in the art, to encrypt data.

If the user authentication is successful, the secure server returns the disk key and a session key to the key logic 370 or application 110. For one embodiment, key logic 370 passes the authentication data to the authentication logic 325 in the secure device 120.

If the user is successfully identified, the secure device 120 starts sending the encrypted data to application 110. The streaming decryption logic 365 receives the data, and uses the keys in key logic 370 to decrypt the data received from the secure device 120. The decrypted data is now available to the application 110. The application 110 may play the data, or otherwise interact with the data, to make it available to the user.

Figure 4:
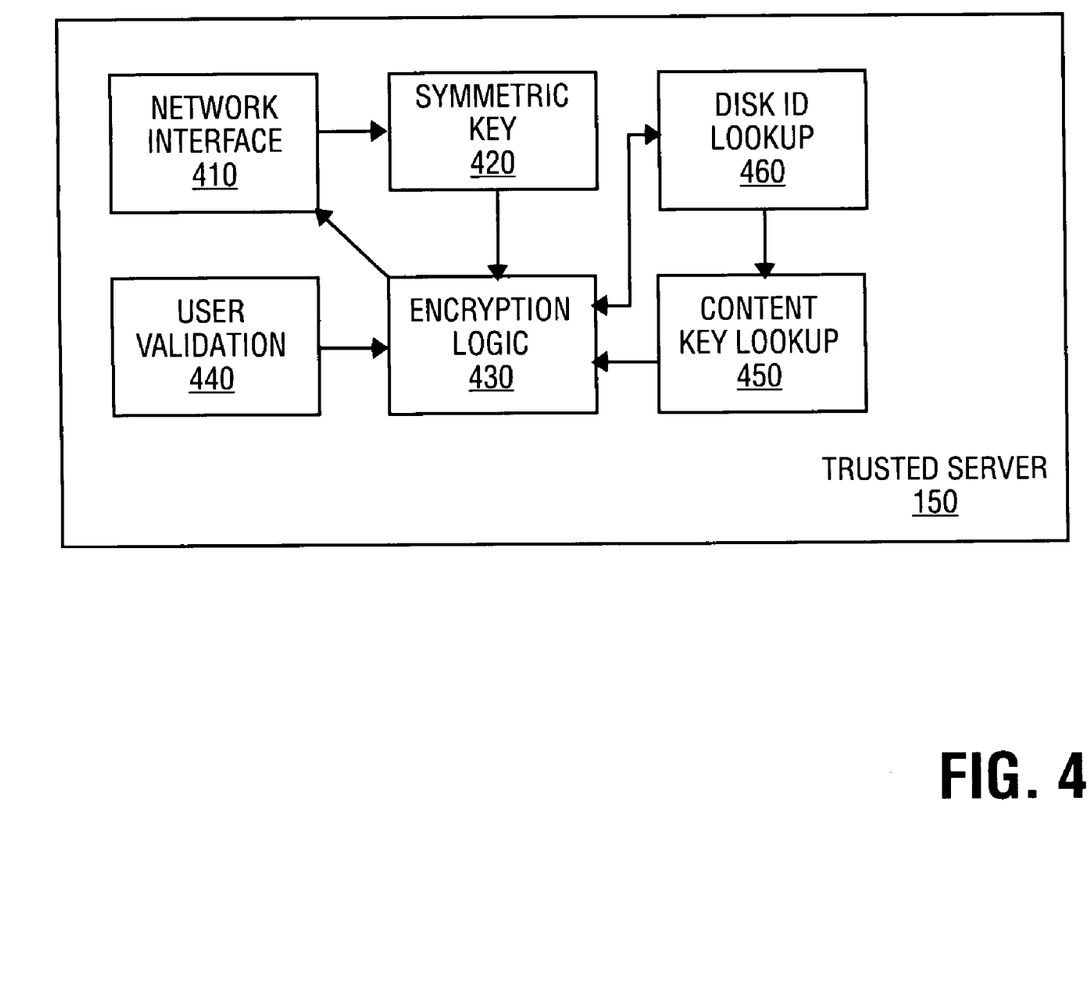
FIG. 4 is a block diagram of one embodiment of the server system.

FIG. 4 is a block diagram of one embodiment of the server system. The trusted server 150 includes a network interface 410 to receive communications from the client system (not shown).

The trusted server 150 receives a disk ID and a symmetric key from a trusted device (not shown) in response to a user request to read data on a secure disk. The encryption logic 430 uses the symmetric key 420 for the particular drive to decrypt the data. The trusted server 150 further includes a disk ID lookup logic 460, which looks up the disk ID, and retrieves an authorization level for the particular disk. This data is then passed to the network interface 410, and the request for user validation, corresponding to the authorization level for the disk. When validation is received, the user validation logic 440 determines whether the validation is correct. As will be described below, the user validation logic 440 determines whether the data received from the user corresponds to the data associated with the disk.

For one embodiment, data such as the request for validation and the user data received is encrypted, using PGP encryption or the like, using encryption logic 430.

If the user validation logic 440 determines that the user has been authenticated as someone with valid access to the disk, then content key lookup logic 450 determines the decryption key for the disk. As discussed above, data is stored encrypted on the disk. The decryption key for the disk is stored on the trusted server 150. The content key lookup 450 passes the disk decryption key to the application on the client system. Furthermore, the session key, received from the trusted drive is also sent back to the application.

For one embodiment, the key used to decrypt the data content may be a modified key, modified by a session key received from the trusted drive, as described above. Thus, the decryption key passed to the application may be a one-time decryption key, since it incorporates both the one-time session key and the permanent disk decryption key.

In this way, the trusted server 150 can securely pass the disk decryption key to an insecure application, to permit an insecure application to access a secure disk.

Figure 5:
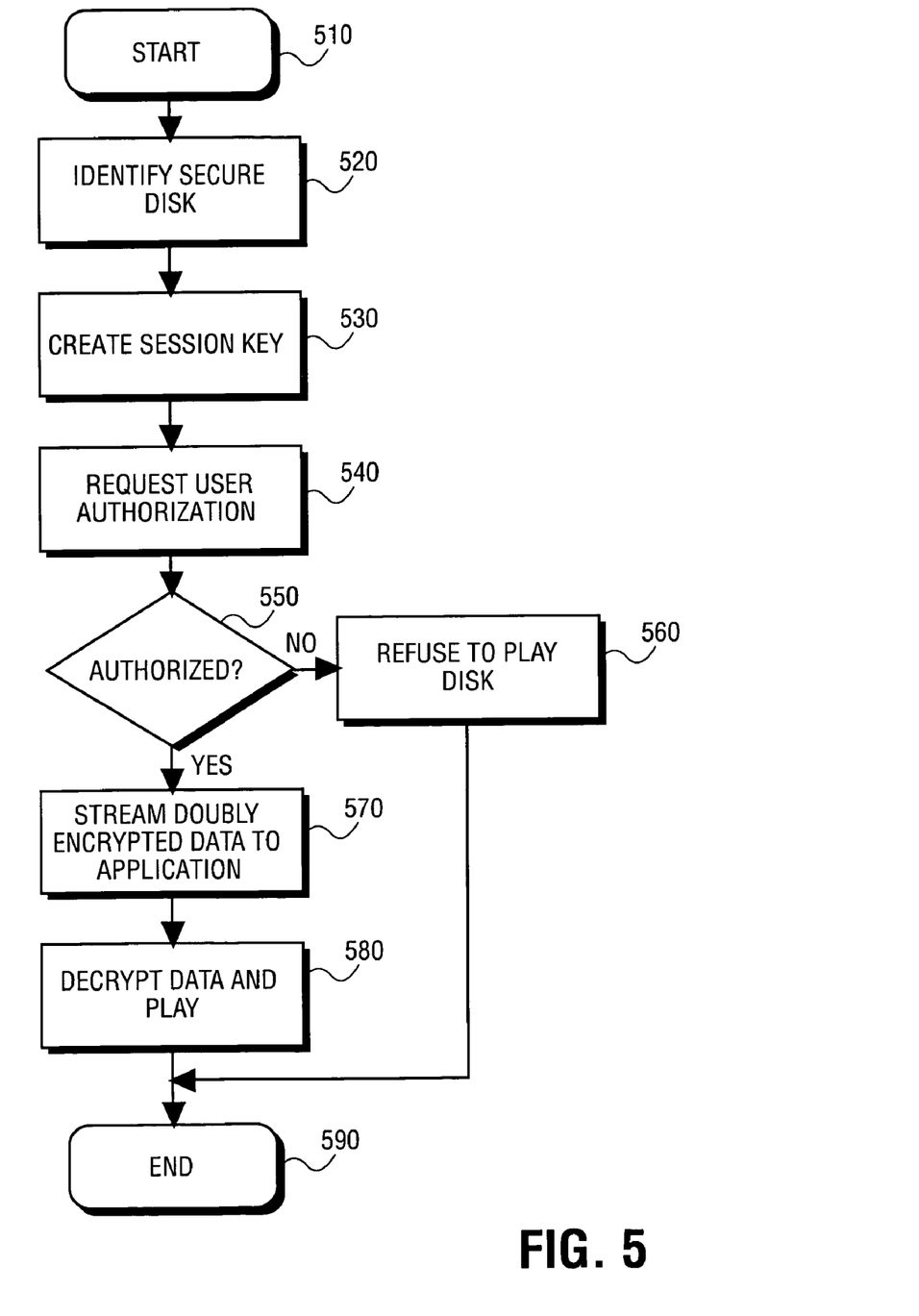
FIG. 5 is an overview flowchart illustrating one embodiment of the secure access method.

FIG. 5 is an overview flowchart illustrating one embodiment of the secure access method. The process starts at block 510, when a user attempts to access a secure disk, using a secure drive.

At block 520, the secure disk is identified. For one embodiment, in response to a drive inquiry about access, the disk returns a disk ID, identifying the particular disk. For one embodiment, the disk ID may be unique to the particular disk. For another embodiment, the disk ID may be shared among a number of disks.

At block 530, the trusted drive generates a session key. For one embodiment, the session key is a public key/private key pair. For another embodiment, the session key may be a random string of numbers. The session key, along with the disk ID is then sent to the server.

At block 540, the server, in response to receiving a disk ID, requests user authorization, through the application.

At block 550, the process determines whether the user is authorized to access the particular disk associated with the disk ID. If the user is not authorized, the process continues to block 560, and the disk is not played. For one embodiment, the user may be informed that the authentication failed, and prompted to attempt to re-authenticate. The process then ends, at block 590.

If the user is found to be authorized to access the disk, the process continues to block 570.

At block 570, the doubly encrypted data is streamed from the secure drive to the application. The data is encrypted with the inherent encryption on the disk, and further encrypted with the session key generated at block 530 above.

At block 580, the data is decrypted by the application and made available to the user. For one embodiment, the data may be music, and the music may be played. The data may be other forms of data, and may be made available as appropriate. The process then ends, at block 590.

Figure 6:
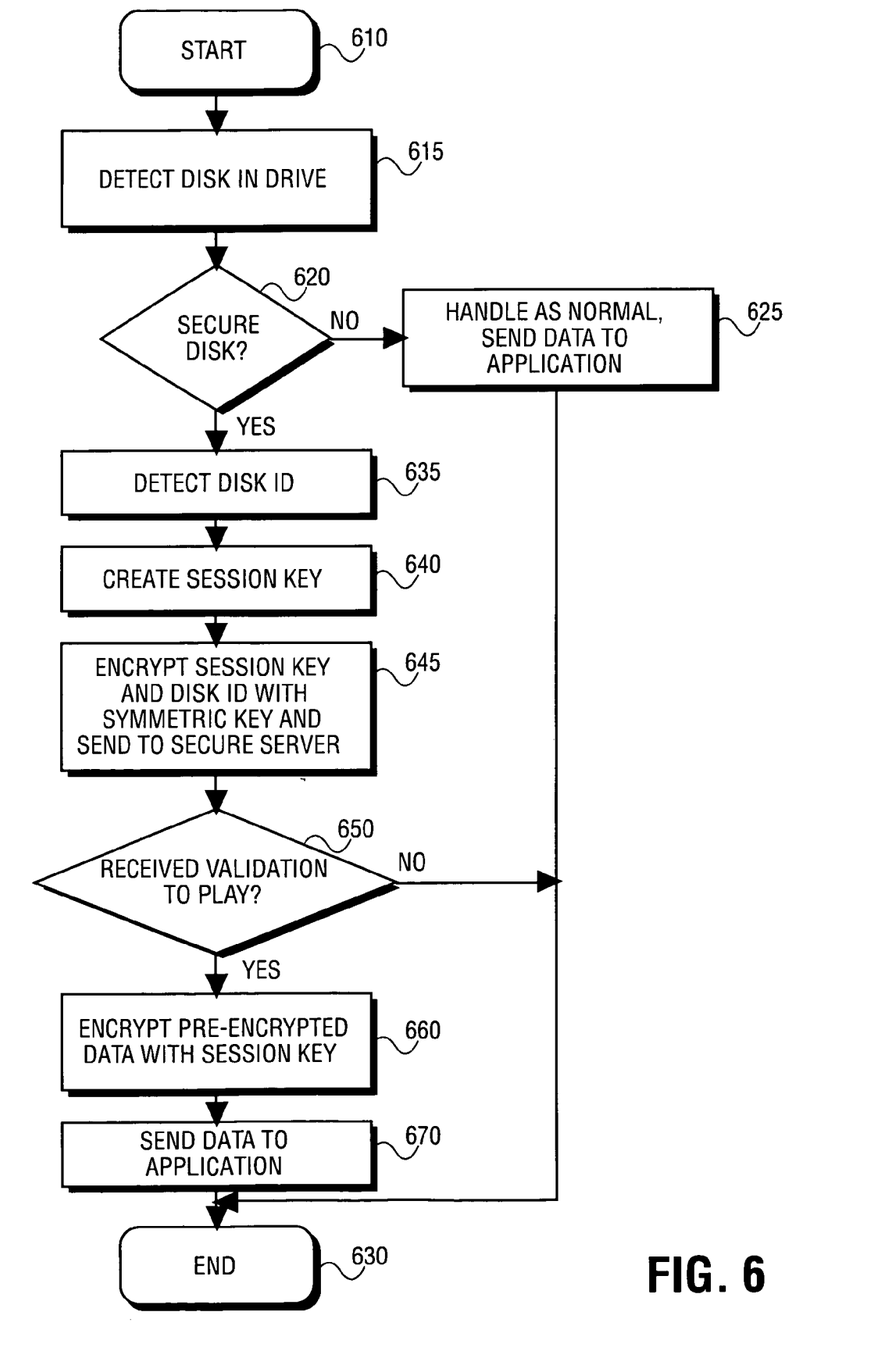
FIG. 6 is a flowchart of one embodiment of the secure drive actions for the secure access.

FIG. 6 is a flowchart of one embodiment of the secure drive actions for secure access. The process starts at block 610, when a new disk is placed in the drive, or when a new request is made to access the disk in the drive.

At block 615, the disk is detected in the drive. At block 620, the process determines whether the disk is a secure disk. If the disk is not a secure disk, the process continues to block 625. At block 625, the data is handled as normal, and sent to the application. The process then ends from the secure drive's perspective, at block 630.

If the disk is a secure disk, at block 620, the process continues to block 635. At block 635, the disk ID of the disk is detected. For one embodiment, the disk ID is a string of numbers uniquely identifying the particular disk. For another embodiment, the disk ID identifies the disk, and is shared by all disks from that particular artist/label/title. For another embodiment, subgroups of disks share the same disk ID.

At block 640, a session key is generated. The session key may be a public key/private key pair, or a random string of numbers, or another type of key. The function of the session key is to prevent replay attacks. Because each session key is unique, attempting to decrypt data using an old key would not work.

At block 645, the session key and the disk ID are encrypted with the symmetric key of the secure drive, and sent to the secure server. For one embodiment, the symmetric key is unique to the particular drive, and the trusted server has a copy of the symmetric key. For another embodiment, another type of encryption may be used to encrypt this data, such as public key/private key encryption. For one embodiment, this data is sent through the insecure computer system. However, since the data is encrypted, the insecure application can not access the data.

At block 650, the process determines whether authorization has been received to pass the data to the application. For one embodiment, authorization is received directly from the trusted server. For another embodiment, authorization is received through the application, using the session key, as will be described below. If no authorization is received within a preset period of time, the process ends at block 630. For one embodiment, there is a time-out function, to prevent someone from hacking into the system to obtain the particular session key, to use for authorizing data access.

If authorization is received, the process continues to block 660.

At block 660, the pre-encrypted data retrieved from the disk is encrypted with the session key. At block 670, the doubly encrypted data is sent by the secure drive to the application. The process then ends, at block 630.

By generating a unique one-time session key, the secure drive can protect access to the disk. If a cracker breaks the disk ID code, he or she still would be unable to access the data on the disk, without the one-time session key. Since the one-time session key is only useful for a limited period of time, such as 5 minutes, it would be very difficult to break the session key. Therefore, data on the disk remains secure.

Figure 7:
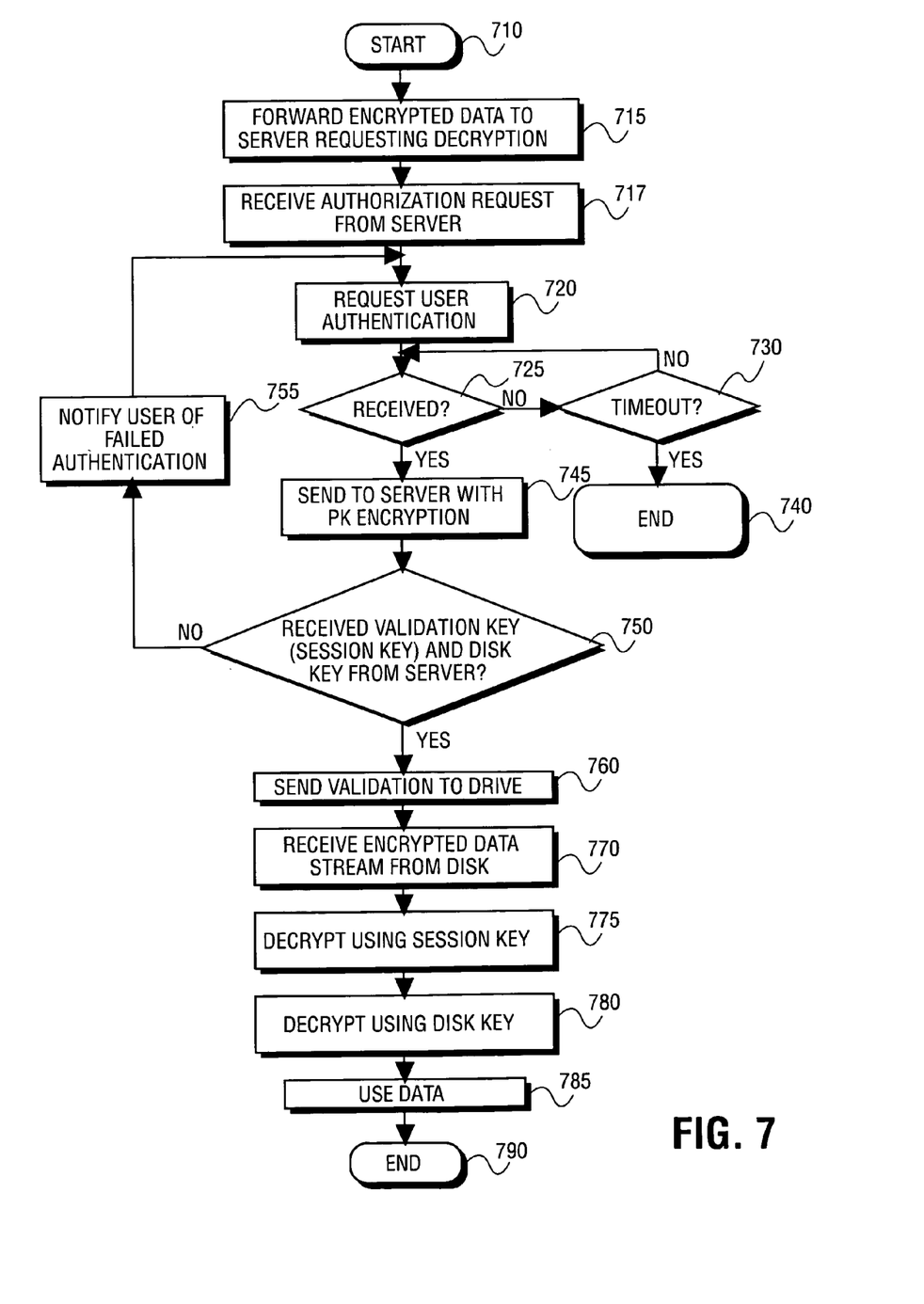
FIG. 7 is a flowchart of one embodiment of the client application actions for the secure access.

FIG. 7 is a flowchart of one embodiment of the client application actions for secure access. The process starts at block 710. For one embodiment, the client application is turned on or run whenever a user wishes to access a disk. The application, as is normal, notifies the drive that it wishes to access the disk.

At block 715, an encrypted data packet is received from the drive, and forwarded to the secure server, requesting decryption. The application recognizes the encrypted data packet, although it can not access the contents.

At block 717, the application receives an authentication request from the secure server. The authentication is provided by the user. Thus, at block 720, the application requests an authentication from the user. For one embodiment, the request from the server specifies which type of authentication should be requested. For another embodiment, a single type of authentication may be used. The authentication mechanism is irrelevant to this process. The types of authentication may be varied, from passwords and user names to biometrics to a smart card or the like. The application requests the appropriate authentication from the user. For another embodiment, the authentication may be within the application, such as a stored password/user ID. In that instance, this block may be skipped, and the application may be directly continue to block 745, to return the authentication data to the secure server.

At block 725, the process determines whether the authentication was received from the user. If no authentication was received, the process, at block 730, determines whether the authentication request has been timed-out. For one embodiment, there may be a time-out feature, to prevent a user from hacking into the system. If there has been a timeout, the process ends at block 740. Otherwise, the process returns to block 725, to wait for the authentication data. For another embodiment, this step may be skipped, and the application may wait indefinitely for the authentication data.

If user authentication was received at block 725, the process continues to block 745.

At block 745, the authentication data is sent to the server. The authentication data, for one embodiment, is encrypted using public key/private key encryption. Alternative methods of protecting the authentication data may be used.

At block 750, the process determines whether a validation key (e.g. session key) and disk key has been received from the server. For one embodiment, this data is again returned using public key/private key encryption. For one embodiment, a single key, comprising a combination of the disk key and the session key may be returned. This would prevent someone from cracking the encryption between the secure server and the application, and obtaining the disk key.

At block 760, a validation is sent to the drive. For one embodiment, the validation comprises data encrypted with the session key. The only way for the application to obtain the session key is from the server, after the user has been authenticated. Thus, this validates to the secure drive that the application has successfully authenticated the user. For one embodiment, data such as a time-stamp or the like is sent, to further make replay attacks difficult.

At block 770, the encrypted data stream is received from the disk. The encrypted data stream is received in response to the original request for the data and the validation.

At blocks 775 and 780, the data is decrypted using the session key and the disk key. For one embodiment, as discussed above a single key, which includes both the session key and the disk key is returned to the application, and the application uses this combined key for decryption. At this point, the data is available to the application.

At block 785, the data is used by the application, as appropriate. For one embodiment, if the data is music or the like, the application plays the music. The process then ends at block 790. For one embodiment, this entire exchange takes less only a few seconds and does not noticeably slow the data availability.

Figure 8:
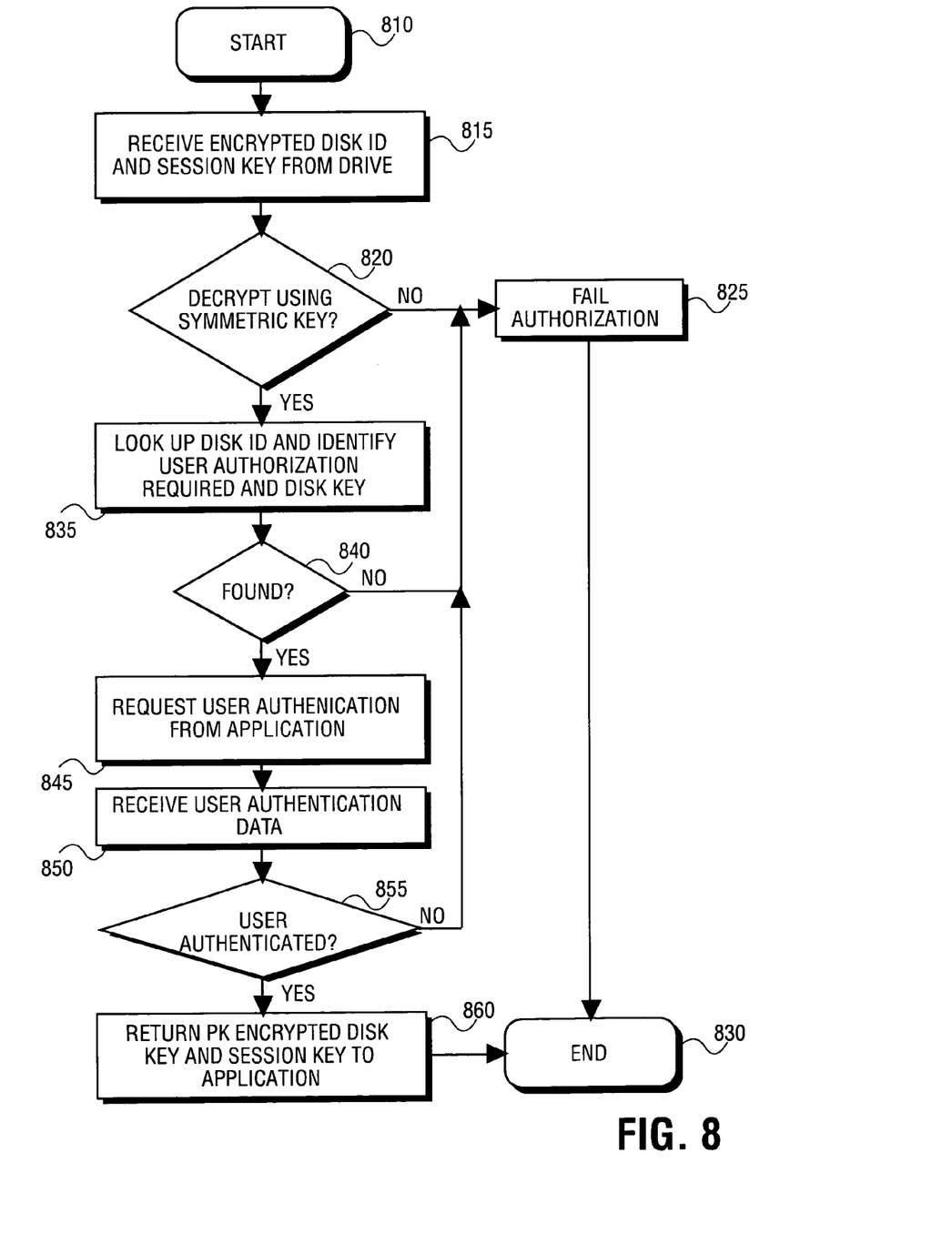
FIG. 8 is a flowchart of one embodiment of the secure server actions for the secure access.

FIG. 8 is a flowchart of one embodiment of the secure server actions for secure access. The process starts at block 810.

At block 815, the server receives the encrypted disk ID and session key from the drive. As described above, in one embodiment, this data is transmitted through the insecure application.

At block 820, the server attempts to decrypt the data using the symmetric key associated with the drive, and determines whether the decryption is successful. If the decryption is not successful, the process continues to block 825, and the authorization process fails. The process then ends at block 830.

If, at block 820, the decryption was successful, the server has a decrypted disk ID and session key. The process then continues to block 835.

At block 835, the process looks up the disk ID, and identifies a user authorization associated with the disk ID, as well as the disk key. For one embodiment, the disk ID is stored in a database, and each disk ID has associated with it a disk key. As discussed above, the disk ID may be unique to the individual disk, to the particular title, to this particular pressing of the particular title, to a particular manufacturing cycle of the disk, or similar. For one embodiment, different authentication levels may be defined by the disk distributor/manufacturer. Thus, the disk ID may be associated with a particular authentication format which should be used for the disk. For example, a label may decide that smart cards should be distributed with each disk, and that the insertion of the smart card into a reader is the appropriate authentication mechanism. Other labels, artists, or manufacturers/creators/distributors may set other authentication mechanisms. For another embodiment, a single authentication mechanism may be used for all disks.

At block 840, the process determines whether the disk ID was found in the database, and whether the corresponding disk key was found. If either was not found, the authorization fails, and the process continues to block 825.

If the disk key is found, the process continues to block 845. At block 845, the appropriate type of user authentication is requested from the application. For one embodiment, this request is passed to the application in an encrypted form. As described above, the application in turn requests authentication from the user, and returns that data to the server.

At block 850, the user authentication data is received from the application. For one embodiment, this data too is received encrypted, and is decrypted by the server. The user authentication data corresponds to the requested data.

At block 855, the process determines whether the user has been successfully authenticated. For one embodiment, the process determines whether the user is already in the database, as an authorized user. If the user is not found in the database, he or she is added to the database. In that case, the authentication is successful. If the user is found in the database, the process determines whether the user is authorized for the particular disk being requested. If the user is authorized, the authentication is successful. If the user is not authorized, the authentication fails. In that case, the process continues to block 825.

If the user is successfully authenticated, the process continues to block 860. At block 860, the disk key and session key are returned to the application. For one embodiment, as discussed above, a single key is returned, which performs the function of both the disk key and session key. The server can combine the two keys, both of which are known to the server. In that case, the application only has to perform a single decryption, and the disk key is never made available to the insecure application or user. The disk key and session key are returned encrypted. The process then ends, at block 830.

The application then can use the keys to validate itself to the secure drive, and decrypt the data received from the secure drive. In this way, replay attacks are prevented, and the data on the secure disk is maintained as secure.

In the foregoing specification, the invention has been described with reference to specific exemplary embodiments thereof. It will, however, be evident that various modifications and changes may be made thereto without departing from the broader spirit and scope of the invention as set forth in the appended claims. For example, although the term "disk" and "drive" were used throughout the specification, it is to be understood that the term "disk" refers to any medium which may be used to store data, while the term "drive" refers to a device for accessing secure content on the medium. The specification and drawings are, accordingly, to be regarded in an illustrative rather than a restrictive sense.

What is claimed is:

1. A method of providing secure access to content comprising:
   determining a secure medium identification (disk ID) from a secure medium including content, wherein the content is stored as encrypted content on the secure medium;
   sending an encrypted one-time session key and the disk ID to a server;
   requesting user authentication;
   if the user is successfully authenticated, receiving a copy of the encrypted one-time session key from the server to enable reading of the content on the secure medium;
   receiving a content decryption key from the server, in response to the disk ID and the user authentication, wherein the content decryption key is determined based on the disk ID;
   using the content decryption key and the session key returned by the server to decrypt the content received from the secure medium; and
   playing the decrypted content.

2. The method of claim 1, further comprising:
   streaming encrypted content from the secure medium to an application.

3. The method of claim 2, wherein the application uses the one-time session key returned by the server to decrypt the encrypted content, and display the decrypted content.

4. The method of claim 1, further comprising a operating trusted device for accessing secure content:
   reading the disk ID from the secure medium and generating the one-time session key; and
   sending an encrypted copy of the disk ID and the one-time session key to the server.

5. The method of claim 4, wherein the disk ID and one-time session key are encrypted using a symmetric key.

6. The method of claim 1, wherein the secure medium is selected from among the following: an optical disc, a flash memory, a hard drive, a magnetic drive, a memory stick, or a storage device to store encrypted content.

7. The method of claim 1, wherein the content is digitally encoded music.

8. The method of claim 1, wherein user authentication comprises one or more of the following: a credit card, a debit card, electronic cash, a user-specific ID card.

9. The method of claim 1, wherein the user authentication comprises one or more of the following: a password, a user identification, a biometric identification.

10. An apparatus comprising a secure device for accessing secure content coupled to a client system comprising:
- a reader to read an identification (ID) and content from a secure medium;
- a session key generation logic to generate a one-time session key;
- an encryption logic to send the ID and the session key encrypted to a server;
- an authentication logic to receive authentication from the server indicating approval to read the content of the secure medium;
- the reader further to pass the ID and the content to the encryption logic;
- the encryption logic further to encrypt the content prior to sending the content to an application; and
- an application on the client system, the application comprising:
    - a user authentication interface to request a user authentication in response to a server request, and to send data received from a user to the server;
    - a key logic to receive a decryption key from the server, if the user is successfully authenticated, wherein the decryption key includes both the session key and a content decryption key; and
    - a streaming decryption logic to receive content from the secure device and to decrypt the content using the decryption key received from the server, and to play the content.

11. The apparatus of claim 10, wherein the encryption logic uses a symmetric key to encrypt the ID.

12. The apparatus of claim 10, further comprising a secure server coupled to the client system via a network, the secure server comprising:
- a network interface to receive the ID and the session key from the secure device;
- a user validation logic to request a user validation from the client system and determine whether the user has permission to access the secure medium identified by the ID; and
- an encryption logic to return the session key and a content decryption key to the client system if the user has permission to access the secure medium.

13. The apparatus of claim 12, further comprising:
the encryption logic further to decrypt data received from the secure device using a symmetric key.

14. The apparatus of claim 12, further comprising:
an ID lookup to determine the content decryption key based on the ID.

15. A client system to securely access digital content on a secure medium, the client system comprising:
- a secure device comprising:
    - a reader to read a disk identification (disk ID) and content from the secure medium;
    - an authentication logic to receive authentication from a server indicating approval to read the content of the secure medium; and
    - an encryption logic further to encrypt the content prior to sending the content to an application;
- the application comprising:
    - a user authentication interface to request a user authentication in response to a server request, and to send user authentication data received from a user to the server;
    - an association logic to determine if the disk ID is associated with the user, and;
        - if the disk ID is not yet associated with the user, to associate the user authentication data with the disk ID; and
        - if the disk ID is associated with the user, determining that the current user authentication matches the user associated with the disk ID, to authenticate the user;
    - a key logic to receive a decryption key from the server, if the user is successfully authenticated; and
    - a streaming decryption logic to receive encrypted content from the secure device and decrypt the encrypted content using the key received from the server, and play the decrypted content.

16. The client system of claim 15, further comprising: a session key generation logic to generate a one-time session key, the session key sent with the ID to the application.

* * * * *